April 5, 1960  S. N. BUCHANAN  2,932,000
HOUSING UNIT AND MOUNTING MEANS
Filed Feb. 11, 1957
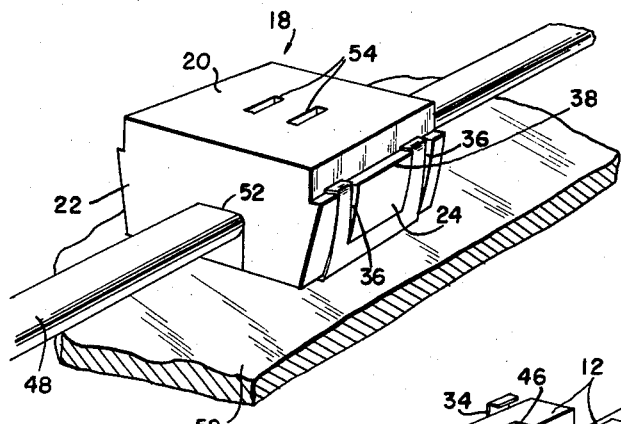
FIG. 1.
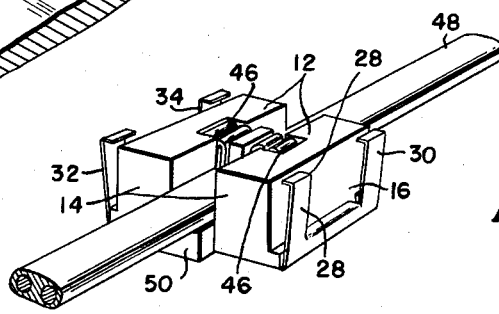
FIG. 4.
FIG. 2.
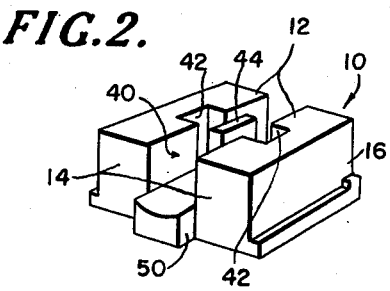
FIG. 3.
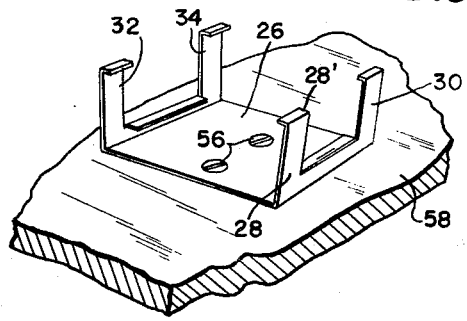
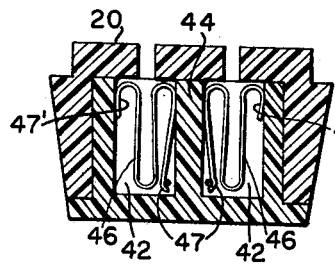
FIG. 5.
INVENTOR
STEPHEN N. BUCHANAN
BY Cushman, Darby & Cushman
ATTORNEYS

2,932,000
HOUSING UNIT AND MOUNTING MEANS

Stephen N. Buchanan, Washington, D.C.

Application February 11, 1957, Serial No. 639,442

2 Claims. (Cl. 339—125)

This invention pertains to electrical housing units and more particularly to electrical housing units characterized by rapid assembly features.

The principles of the present invention will be described mainly with reference to an electrical plug-in receptacle as a primary illustrative embodiment. However, no particular limitation is intended.

In accordance with the present invention, an electrical housing unit is made up of a base member, a cover member and a clip member, and a cable may be clamped between the cover and base members. The clip member may be mounted upon any desired surface and the remainder of the components thusly supported.

Therefore, it is a primary object of this invention to provide a housing unit which may be rapidly assembled from its component parts without use of screws or other labor consuming devices. Further objects and the entire scope of the invention will become more fully apparent from the following detailed description of an illustrative embodiment, and from the appended claims.

The features of the invention may be best understood with reference to the accompanying drawings, wherein:

Figure 1 shows a view of an assembled unit in accordance with the invention.

Figure 2 shows a base member according to the invention.

Figure 3 shows a clip member according to the invention, and

Figure 4 shows the base member positioned within the clip member and with an electrical cable positioned in the base member.

Figure 5 shows a cross-sectional view of a unit with cover member assembled to the base member and electrical contact members therein.

First considering the invention broadly, it contemplates a base member designated generally as 10 (Fig. 2) characterized by having a top surface 12 and four side surfaces, two of which, 14 and 16, are visible in the drawings. The base member further includes a bottom surface not directly visible in the drawings, but which will be fully understood therefrom.

A cover member designated generally as 18 (Fig. 1) is comprised of a top panel 20 and four side panels, two of which panels 22 and 24 are visible in the drawings. There is no bottom panel. Instead, the bottom is opened and the inside surfaces of the side panels are arranged to just fit over the side surfaces of the base member 10. This causes the base member to be captive within the cover member in all but the downward direction.

The clip member is comprised of a mounting portion 26 and upstanding clip arms 28, 30, 32 and 34. Each clip arm is provided with an inturned end such as end 28' of arm 28. It is contemplated that the clip member will be fabricated of a resilient metal or the like so that the arms 28 will have considerable ability to resume positions substantially as shown in Figure 3 following deflection from said positions.

The cover member 18 is further provided with recesses 36 in two opposed side panels, the recesses 36 in side panel 24 being apparent in Figure 1. The cover member is further provided with ledge means 38. As is apparent from the assembly view of Figure 1, the cover member 18 may be slipped downwardly into the clip member so that the upstanding clip arms lie in recesses, and the inturned ends of the clip arms hook over the ledges 38. The cover is now fixed with respect to the clip member upwardly due to the restraining action of the ledges, and is restrained from sliding out of the open ends of the clip member due to the fact that the clip arms lie within the recesses 36. Transverse motion is precluded by virtue of the fact that the clip arms form an effective wall on either side of the clip member. The resiliency of the clip arms inwardly prevents disengagement of the inturned ends of the clip arms from the ledges.

It will be apparent that the combination of base, cover and clip members as above described is particularly useful for electrical wiring units. Additionally, the combination of components is particularly useful with the internal electrical connector and clamping features shown in my copending application Serial No. 614,504, filed October 8, 1956 for Electrical Wiring Unit. The present application shows as a particular illustrative embodiment a plug-in receptacle unit. For this purpose the base member is provided with a channel 40 and the opposed sections of the base member defining this channel also include recesses 42. A post 44 is positioned centrally in the channel between the recesses.

As shown in Figure 5 the contact members 46 may be of resilient metal, and at one end 47 bear against stripped portions of conductors of a cable passing through the unit, as described below. Otherwise, the contact members 46 have a U-shaped section for receiving plug prongs through aligned openings in the top panel 20 of the cover member, with the other end 47' of the contact members bearing against the outer wall of the chamber 42. The base member may have a protruding part 50 upon which the cable 48 may be supported. Additionally, the cover member may have a portion removed as from side panel 22 to provide an area 52 for engaging the top of the sheathing of the cable 48. Thus, in assembly of the components the cable will be clamped between the portions 50 and 52 of the base and cover members, respectively. Of course, it will be understood that the electrical contact members may be of other design without limitation upon the present invention. Also, the cable may terminate within the unit and/or the unit may be a multiple outlet receptacle, etc. according to the various features of the aforesaid copending application.

Where the unit is a receptacle, openings 54 may be provided through the top panel of the cover member for insertion of plug prongs therethrough into engagement with the contact members 46.

The clip member may have apertures in the portion 26 for receiving securing devices such as screws 56 for attaching the clip member and eventually the remainder of the components to any desired supporting surface 58.

From the foregoing it will be apparent that by the present invention there is provided a housing unit particularly well adapted for electrical work. For example, an electrical outlet receptacle can be quickly installed simply by first stripping insulation from the cable as desired, fixing the clip member to the intended surface, then slipping the cable into the base member in engagement with electrical contact members, and then slipping the cover member over the base member and within the clip arms until the latter snap into position. This rapid procedure is to be compared with the extremely expensive and laborious procedure presently known in the electrical wiring trade, of first mounting a box, then bringing cables into the box by use of separate connectors, then fixing conductors to a separate receptacle unit to be mounted within the box, stuffing the conductors into the box behind the receptacle, and then affixing a still further cover.

It will be understood that the illustrative embodiments are shown only for describing the inventive features generally, and the true scope of the invention is to be determined from the appended claims.

What is claimed is:

1. A housing unit and mounting means therefor comprising a base member having top, bottom and four side surfaces, a cover member for fitting over the base member from the top surface thereof, the cover member having a top panel and four side panels for fitting proximate to the top and respective four side surfaces of the base member, an opposed pair of side panels having recesses and ledges therein on the outer surfaces thereof, and a clip member for retaining the base and cover members together and for mounting the combined members on a surface, the clip member having a mounting portion and clip arms upstanding therefrom, the arms being positioned to lie in said recesses of the cover member, the arms also having inturned means for engaging the ledges in the cover member, and means in the mounting portion for affixing the clip means to a surface, the arrangement being such that the clip means can be first affixed to a surface, the base member placed within the arms of the clip means and the cover member then slipped over the base member to permit the clip arms to lie in said recesses and engage in said ledges.

2. An electrical receptacle unit and mounting means therefor comprising a base member having top, bottom and four side surfaces, a channel at least partially through the base member for receiving an electrical cable, recesses in the base member for receiving electrical contact member for engagement with the conductors of the cable, a cover member for fitting over the base member from the top surface thereof, the cover member having a top panel and four side panels for fitting proximate to the top and respective four side surfaces of the base member, at least one of the panels of the cover member being formed to clamp against the cable to fix the cable sheathing between said cover panel and a portion of the base member, a pair of the side panels of the cover member having recesses and ledges therein on the outer surfaces thereof, and a clip member for retaining the base and cover members together and for mounting the combined members on a surface, the clip member having a mounting portion and clip arms upstanding therefrom, the arms being positioned to lie in said recesses of the cover member, the arms also having inturned ends for engaging the ledges in the cover member, means in the mounting portion for affixing the clip means to a surface, and apertures in the cover member for receiving prongs of a plug for engagement with the contact members, the arrangement being such that the clip means can be affixed to a surface, the base member presented within the arms of the clip means and the cable laid in the base member, and the cover member slipped over the base member to clamp the cable sheathing between the cover member and the base member and to permit the clip arms to lie in said recesses and the ends of the clip arms to engage in said ledges.

References Cited in the file of this patent

UNITED STATES PATENTS

| | | |
|---|---|---|
| 1,983,725 | Abramson | Dec. 11, 1934 |
| 2,587,239 | Smith | Feb. 26, 1952 |
| 2,749,527 | Gast | June 5, 1956 |
| 2,784,398 | Mysse | Mar. 5, 1957 |